(12) United States Patent
Roberts et al.

(10) Patent No.: US 11,215,439 B2
(45) Date of Patent: *Jan. 4, 2022

(54) METHOD AND APPARATUS FOR A PRECISION POSITION SENSOR

(71) Applicant: TEXTRON INNOVATIONS INC., Providence, RI (US)

(72) Inventors: David Bryan Roberts, Bedford, TX (US); Charles Eric Covington, Colleyville, TX (US); Brady Garrett Atkins, Euless, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/840,996

(22) Filed: Apr. 6, 2020

(65) Prior Publication Data

US 2020/0232781 A1 Jul. 23, 2020

Related U.S. Application Data

(63) Continuation of application No. 15/902,133, filed on Feb. 22, 2018, now Pat. No. 10,641,597.

(51) Int. Cl.
*G01B 7/30* (2006.01)
*G01B 7/04* (2006.01)
*G01B 11/26* (2006.01)
*G01D 5/347* (2006.01)
*G01B 11/04* (2006.01)
(Continued)

(52) U.S. Cl.
CPC ............ *G01B 7/30* (2013.01); *B64C 29/0033* (2013.01); *G01B 7/042* (2013.01); *G01B 11/043* (2013.01); *G01B 11/26* (2013.01); *G01D 5/2497* (2013.01); *G01D 5/3473* (2013.01); *G01B 2210/60* (2013.01)

(58) Field of Classification Search
None
See application file for complete search history.

(56) References Cited

U.S. PATENT DOCUMENTS 2,993,200 A * 7/1961 Walker .................... H03M 1/00
341/2
4,060,799 A * 11/1977 Jones .................... G08C 19/46
340/870.34

(Continued)

*Primary Examiner* — Christopher W Fulton
(74) *Attorney, Agent, or Firm* — Daniel J. Chalker; Edwin S. Flores; Chalker Flores, LLP

(57) ABSTRACT

A method and system to measure a parameter associated with a component, device, or system with a specified accuracy, including: providing one or more sensors operably disposed to detect the parameter; obtaining a coarse measurement of the parameter within a first range using the one or more sensors, wherein the first range includes minimum and maximum values for the parameter; obtaining a fine measurement of the parameter within a second range using the one or more sensors, wherein the second range is smaller than the first range and has a specified ratio to the first range that provides the specified accuracy; determining a current value of the parameter by combining the coarse and fine measurements; and providing the current value of the parameter to a communications interface, a storage device, a display, a control panel, a processor, a programmable logic controller, or an external device.

26 Claims, 12 Drawing Sheets

(51) Int. Cl.
  *B64C 29/00*  (2006.01)
  *G01D 5/249*  (2006.01)

(56) References Cited

U.S. PATENT DOCUMENTS

| | | | | |
|---|---|---|---|---|
| 4,207,505 | A * | 6/1980 | Falck | G01B 7/004 |
| | | | | 318/595 |
| 4,533,902 | A * | 8/1985 | Baker | H03M 1/645 |
| | | | | 324/207.25 |
| 5,311,666 | A * | 5/1994 | Jacobsen | G01D 5/2415 |
| | | | | 33/1 N |
| 5,440,501 | A * | 8/1995 | Shimomura | G01D 5/2415 |
| | | | | 324/662 |
| 5,874,821 | A * | 2/1999 | Monleone | H02P 6/16 |
| | | | | 318/600 |
| 7,571,552 | B2 * | 8/2009 | McAdam | G01D 5/2451 |
| | | | | 33/1 PT |
| 9,482,509 | B2 * | 11/2016 | Atherton | G01B 3/18 |
| 10,641,597 | B2 * | 5/2020 | Roberts | G01B 7/30 |
| 10,697,772 | B1 * | 6/2020 | Sorenson | G01C 19/5684 |
| 2016/0098019 | A1 * | 4/2016 | Kirshenboim | H02P 6/16 |
| | | | | 318/650 |
| 2018/0231400 | A1 * | 8/2018 | Okumura | G01D 5/2454 |

* cited by examiner

METHOD AND APPARATUS FOR A PRECISION POSITION SENSOR

CROSS-REFERENCE TO RELATED APPLICATIONS

This application claims priority to and is a continuation application of U.S. patent application Ser. No. 15/902,133, filed Feb. 22, 2018, now U.S. Pat. No. 10,641,597, entitled "Method and Apparatus for a Precision Position Sensor", the entire contents of which are incorporated herein by reference.

TECHNICAL FIELD OF THE INVENTION

The present invention relates in general to the field of sensors, and more particularly, to a method and apparatus for precisely measuring angular or linear displacement.

STATEMENT OF FEDERALLY FUNDED RESEARCH

Not applicable.

BACKGROUND OF THE INVENTION

Without limiting the scope of the invention, its background is described in connection with angular measurement sensors in tiltrotor aircraft.

Precise and accurate measurements of absolute angular positions are necessary in many control and monitoring applications. Many traditional angular measurement sensors are limited in displacement. For example, rotary variable differential transformers (RVDTs) have a maximum angular displacement of around 80°. Resolvers are capable of measuring a complete revolution (360°), but they must be limited to one revolution if an absolute measurement is required, as further rotation of the sensor results in an identical electrical reading for more than one physical angular input. Gear reduction can be used to better match the physical position to be measured to the physical capabilities of the sensor. However, since the electrical output of the sensor is limited, both the accuracy and resolution of the resulting measurement are limited. Similar difficulties exist for obtaining a variety of precise and accurate measurements.

For example, the rotation of the pylon/nacelle in some tiltrotor aircraft is typically measured using a resolver. In one example, the required accuracy is achieved using resolvers, but eight resolvers are needed and the wiring is very complex. In another example, absolute measurement resolvers are used, but each resolver is limited to less than 360 degrees to avoid identical electrical readings for more than one physical measurement, enabling absolute measurements but limiting precision and accuracy.

Thus, a need exists for methods and systems for measurement of precise and accurate measurements that are better than measurements available with sensors that are limited in displacement.

SUMMARY OF THE INVENTION

In some embodiments of the disclosure, a method for measuring a parameter associated with a component, device, or system with a specified accuracy is disclosed as comprising providing one or more sensors operably disposed with respect to the component, device, or system to detect the parameter associated with the component, device, or system; obtaining a coarse measurement of the parameter within a first range using the one or more sensors, wherein the first range includes a minimum value and a maximum value for the parameter; obtaining a fine measurement of the parameter within a second range using the one or more sensors, wherein the second range is smaller than the first range and has a specified ratio to the first range that provides the specified accuracy; determining a current value of the parameter by using a processor to combine the coarse measurement and the fine measurement; and providing the current value of the parameter to the processor, a communications interface, a storage device, a display, a control panel, a programmable logic controller, or an external device. In one aspect, the parameter includes a linear position, a linear distance, an angular position, an angular distance, a displacement, a magnitude, a fluid level, or a signal level; the processor includes a controller, a microprocessor, a computer, an electrical circuit, or a combination thereof; and the one or more sensors include at least a first sensor for the coarse measurement and at least a second sensor for the fine measurement. In another aspect, the first sensor includes a rotary variable differential transformer (RVDT), a linear variable differential transformer (LVDT), a resolver, a synchro, an optical encoder, a magnetic encoder, a linear potentiometer, a rotary potentiometer, or a Hall-effect device; and the second sensor includes the resolver, the synchro, the optical encoder, or the magnetic encoder. In another aspect, combining the coarse measurement and the fine measurement includes combining the first measurement and the second measurement mechanically, electrically, electronically, or magnetically. In another aspect, the determining and providing steps are performed by the one or more sensors, the processor, or a combination thereof. In another aspect, the method further includes obtaining one or more additional measurements of the parameter within one or more additional ranges using the one or more sensors, wherein each additional range has an additional specified ratio to the first range or to the second range that provides the specified accuracy; and the current value for the parameter is determined by combining the coarse measurement, the fine measurement, and the one or more additional measurements. In another aspect, the method further includes receiving an input signal representing the parameter; creating a first signal by dividing or multiplying the input signal by a first ratio and using the first signal to obtain the fine measurement of the parameter; and creating a second signal by dividing or multiplying the input signal by a second ratio and using the second signal to obtain the coarse measurement of the parameter. In another aspect, the method further includes determining an error associated with the current value of the parameter; or calibrating the one or more sensors.

In some embodiments of the disclosure, a method for determining a position of a component within a physical travel range of the component is disclosed as comprising providing one or more sensors operably disposed with respect to the component to detect the position of the component; receiving a displacement signal corresponding to the position of the component within the physical travel range wherein the displacement signal has a displacement range; producing a coarse signal by decreasing the displacement signal using a first ratio; producing a fine signal by increasing the displacement signal using a second ratio; generating a first measurement based on the coarse signal using a first sensor having a first range; generating a second measurement based on the fine signal using a second sensor having a second range; determining a coarse measurement of the position of the component by selecting a predefined value from a set of predefined values based the first measurement, wherein the set of predefined values is defined by the displacement range, the second ratio and the second range; determining a fine measurement of the position of the component by increasing the second measurement by an inverse of the second ratio; and determining the position of the component by combining the coarse measurement and the fine measurement; and wherein the foregoing steps are performed by the one or more sensors, a processor or a combination thereof. In one aspect, determining the coarse measurement is further based on the second measurement whenever the selection of the predefined value cannot be precisely determined from the first measurement alone. In another aspect, the combining the first measurement and the second measurement includes combining the first measurement and the second measurement mechanically, electrically, electronically, or magnetically. In another aspect, the processor includes a controller, a microprocessor, a computer, an electrical circuit, or a combination thereof; and the one or more sensors include at least a first sensor for the coarse signal and at least a second sensor for the fine signal.

In some embodiments of the disclosure, a method of optimizing a measurement system is disclosed as comprising determining for a first sensor a set of performance criteria, including at least an overall measurement range, necessary for a displacement or other physical parameter to be measured; determining whether the first sensor coupled to interfacing equipment is operably disposed to meet the set of performance criteria; if the first sensor cannot meet the set of performance criteria except for the overall measurement range, identifying a second sensor that is operably disposed to meet the set of performance criteria; and determining an optimal number of cycles of the second sensor to distribute over the full range of the physical parameter to be measured and available means of coupling the sensor to the physical parameter to be measured.

In some embodiments of the disclosure, an apparatus for measuring a parameter associated with a component, device, or system with a specified accuracy is disclosed as comprising one or more sensors, wherein the one or more sensors are: operably disposed to obtain a coarse measurement of the parameter within a first range, wherein the first range includes a first minimum value and a first maximum value for the parameter; and operably disposed to obtain a fine measurement of the parameter within a second range, wherein the second range is smaller than the first range and has a specified ratio to the first range that provides the specified accuracy; and a processor communicably coupled to the one or more sensors. In one aspect, the parameter includes a linear position, a linear distance, an angular position, an angular distance, a displacement, a magnitude, a fluid level, or a signal level; the processor includes a controller, a microprocessor, a computer, an electrical circuit, or a combination thereof; and the one or more sensors include at least a first sensor for the coarse measurement and at least a second sensor for the fine measurement. In another aspect, a first sensor of the one or more sensors includes a rotary variable differential transformer (RVDT), a linear variable differential transformer (LVDT), a resolver, a synchro, an optical encoder, a magnetic encoder, a linear potentiometer, a rotary potentiometer, or a Hall-effect device. In another aspect, a second sensor of the one or more sensors includes a resolver, a synchro, an optical encoder, or a magnetic encoder. In another aspect the processor is operably disposed to: receive an input signal representing the parameter; create a first signal by dividing or multiplying the input signal by a first ratio and using the first signal to obtain the fine measurement of the parameter; and create a second signal by dividing or multiplying the input signal by a second ratio and using the second signal to obtain the coarse measurement of the parameter. In another aspect, wherein the processor is operably disposed to: determine an error associated with a current value of the parameter; or calibrate the one or more sensors.

In some embodiments of the disclosure, a rotorcraft is disclosed as including a fuselage; one or more engines coupled to the fuselage; one or more sensors coupled to the one or more engines, wherein the one or more sensors are: operably disposed to obtain a coarse measurement of a parameter associated with a component, device, or system with a specified accuracy within a first range, wherein the first range includes a first minimum value and a first maximum value for the parameter; and operably disposed to obtain a fine measurement of the parameter within a second range, wherein is smaller than the first range and has a specified ratio to the first range that provides the specified accuracy; and a processor communicably coupled to the one or more sensors.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
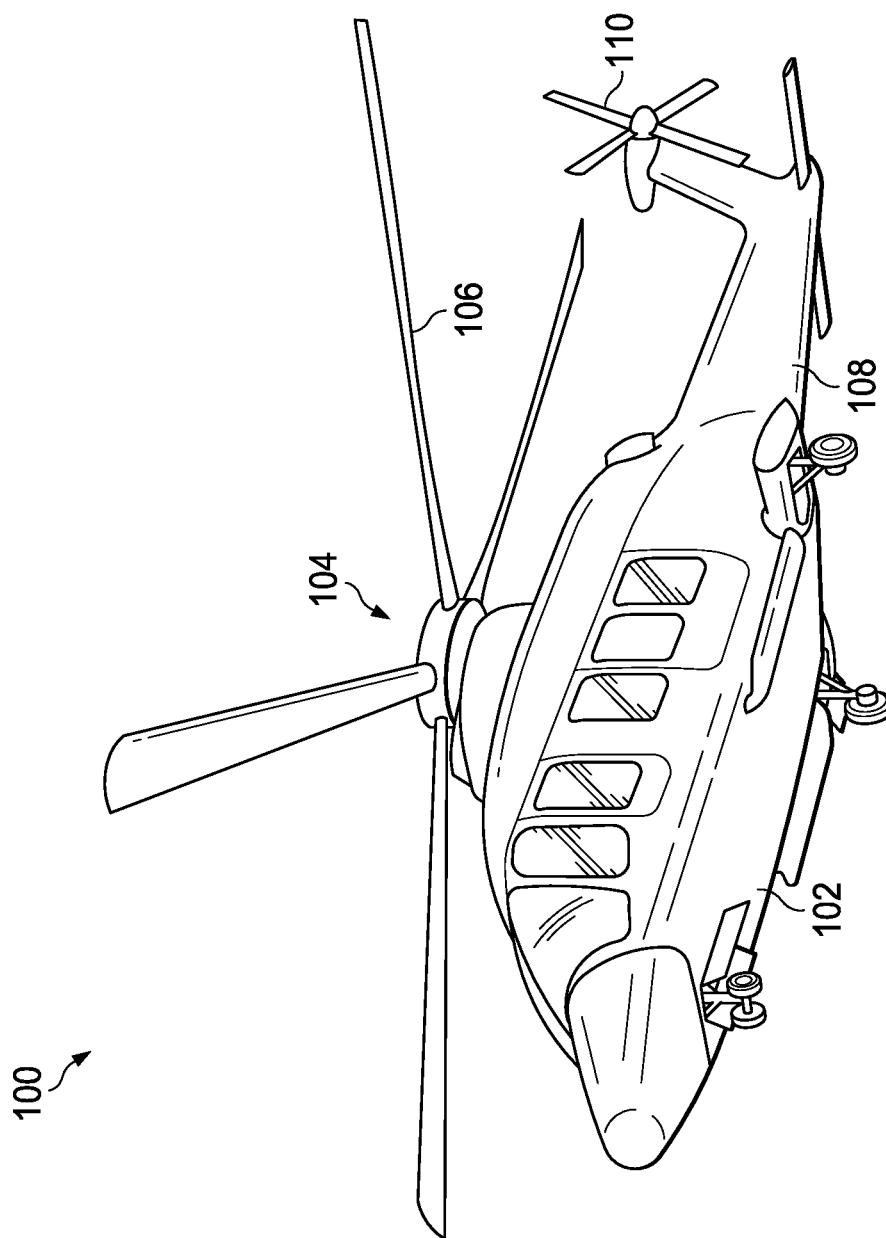
FIG. 1 shows a side view of a helicopter according to a particular embodiment of the present invention.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention is described herein with reference to tiltrotor aircraft and more specifically to measurement of absolute angular positions as an example. Those skilled in the art will recognize that the present invention can be used on any type of aircraft (e.g., fixed or rotorcraft, manned or unmanned, etc.), and non-aircraft components, devices or systems where precision measurements are desired. In addition, those skilled in the art will recognized that the present invention can be used to measure other parameters, such as a linear position, a linear distance, an angular distance, a displacement, a magnitude, a fluid level, a signal level, etc.

The present invention overcomes the limitations of the prior art by combining a fine measurement (e.g., fine relative angular measurement, etc.) with a coarse measurement (e.g., course absolute angular measurement, etc.). In one embodiment, a fine relative angular measurement is made by a first sensor (e.g., an angular position sensor, etc.) configured to rotate several revolutions over the physical travel to be measured. Since the first sensor rotates more than one revolution, the position measurement is electrically ambiguous. As a result, a second sensor is configured to provide a coarse absolute angular measurement. The two measurements are combined in such a way as to provide a high precision, absolute angular measurement over the physical travel to be measured.

The fine measurement and coarse measurement of the sensor of the present invention can be accomplished with the same type of device or sensor, but scaled differently, or each can use a different type of device or sensor. For example, the fine measurement can be made using a resolver, a synchro, an optical encoder, a magnetic encoder, or any other device that provides a continuous 360 degree angular measurement over multiple revolutions. For example, the course measurement can be made using a rotary variable differential transformer (RVDT), a linear variable differential transformer (LVDT), a resolver, a synchro, an optical encoder, a magnetic encoder, a linear potentiometer, a rotary potentiometer, a Hall-effect device, or any other device that provides an absolute measurement over the physical travel to be measured.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
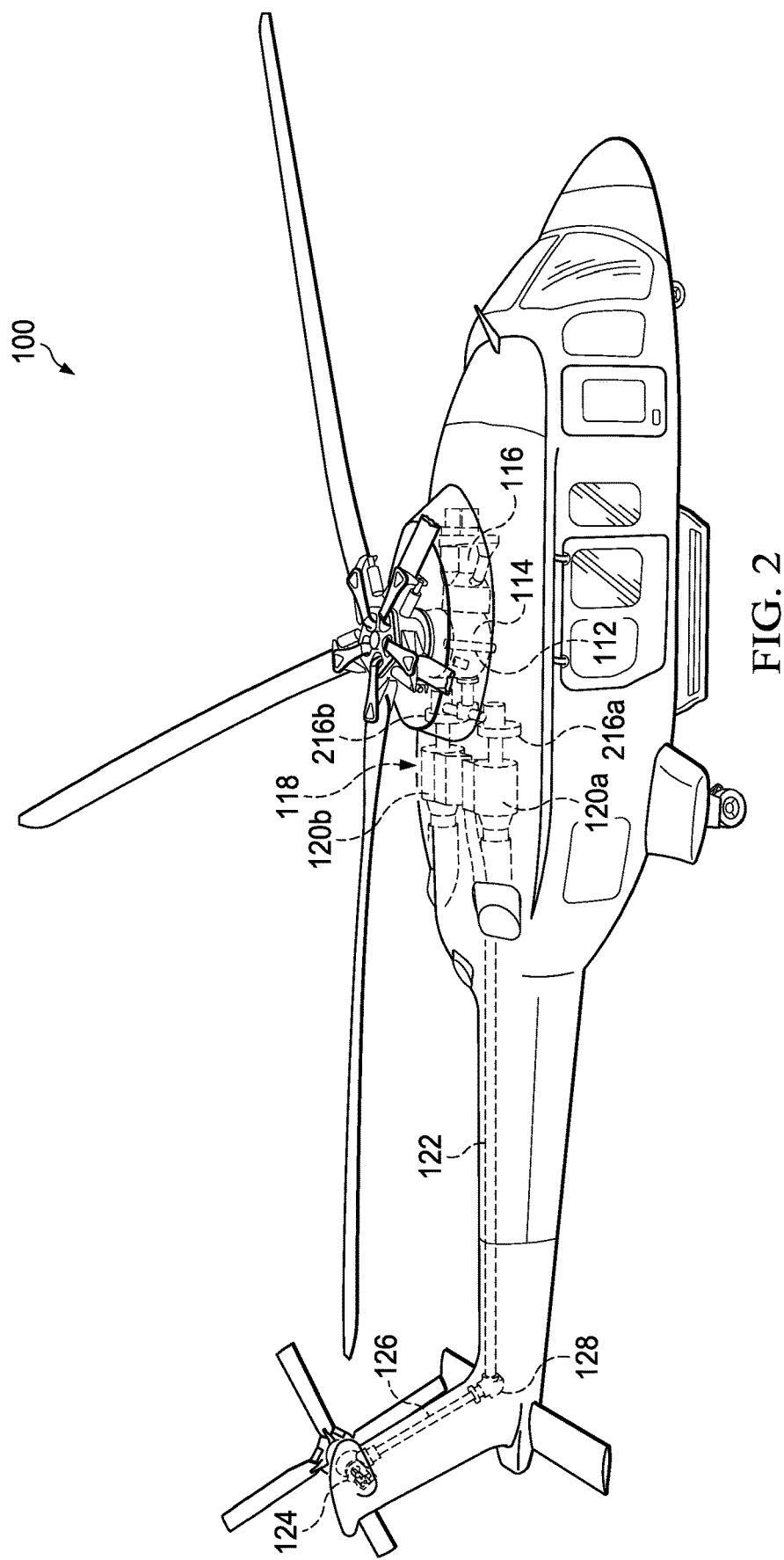
FIG. 2 shows a partial cross-section, perspective view of a helicopter according to an embodiment of the present invention.

For example, FIG. 2 shows a partial cross-section perspective view of aircraft 100 that includes additional detail of the present invention. Aircraft 100 further includes a rotor mast 112, which is connected to the main rotor gearbox 114 via a main rotor mast. The main rotor gearbox 114 is connected to one or more accessory gear boxes 116 and one or more reduction gearboxes 216a, 216b. Each reduction gearbox 216a, 216b is connected to one or more engines 120a, 120b, which are within an engine compartment 118. A tail rotor drive shaft 122 transmits mechanical rotation to the tail rotor gear box 124, which is connected via tail rotor drive shaft 126 and intermediate gear box 128.

Figure 3A:
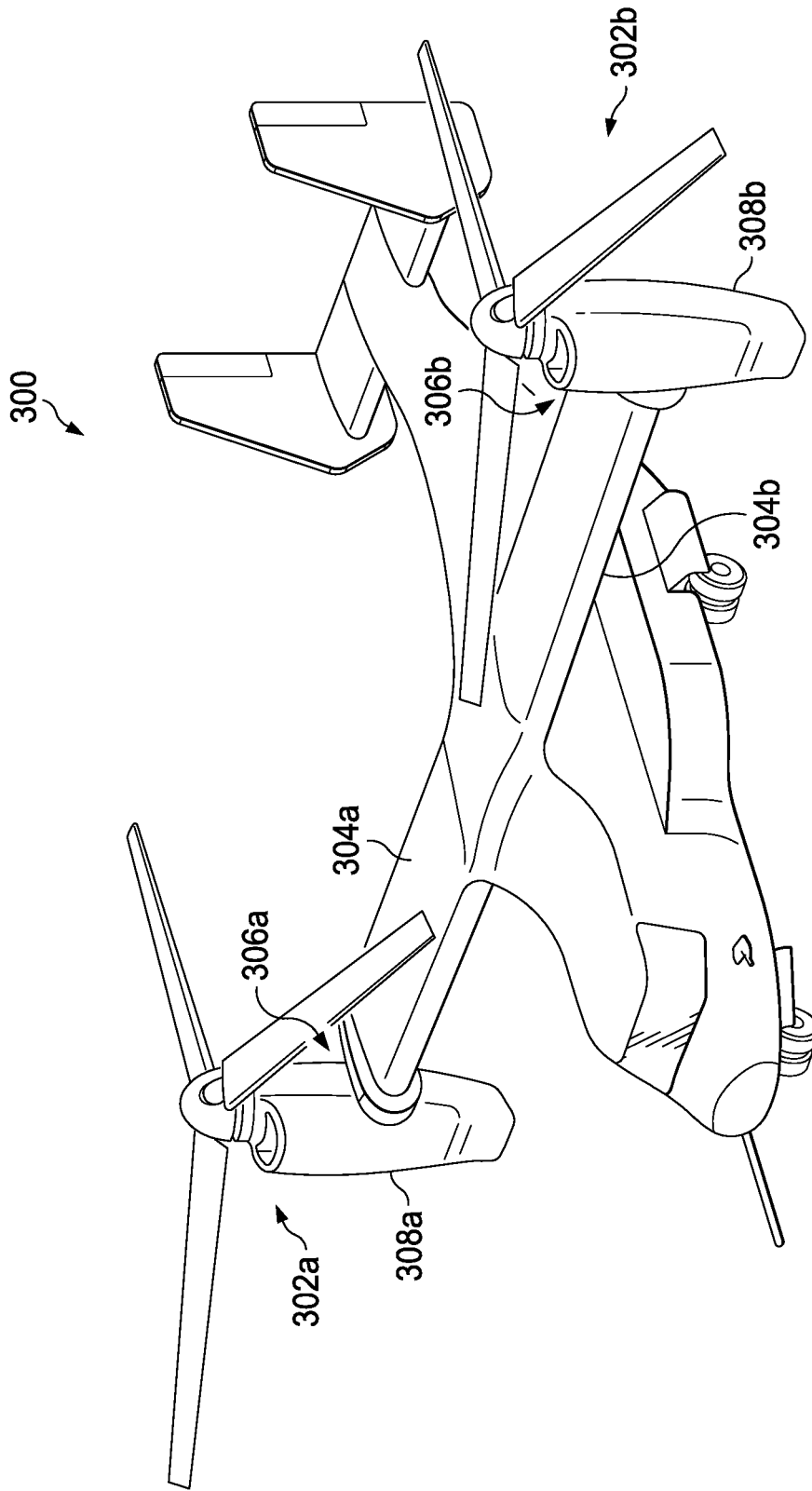
FIG. 3A shows a perspective view of a first tiltrotor aircraft in which the rotor system is in a takeoff-and-landing mode or hover mode according to a particular embodiment of the present invention.
Figure 3B:
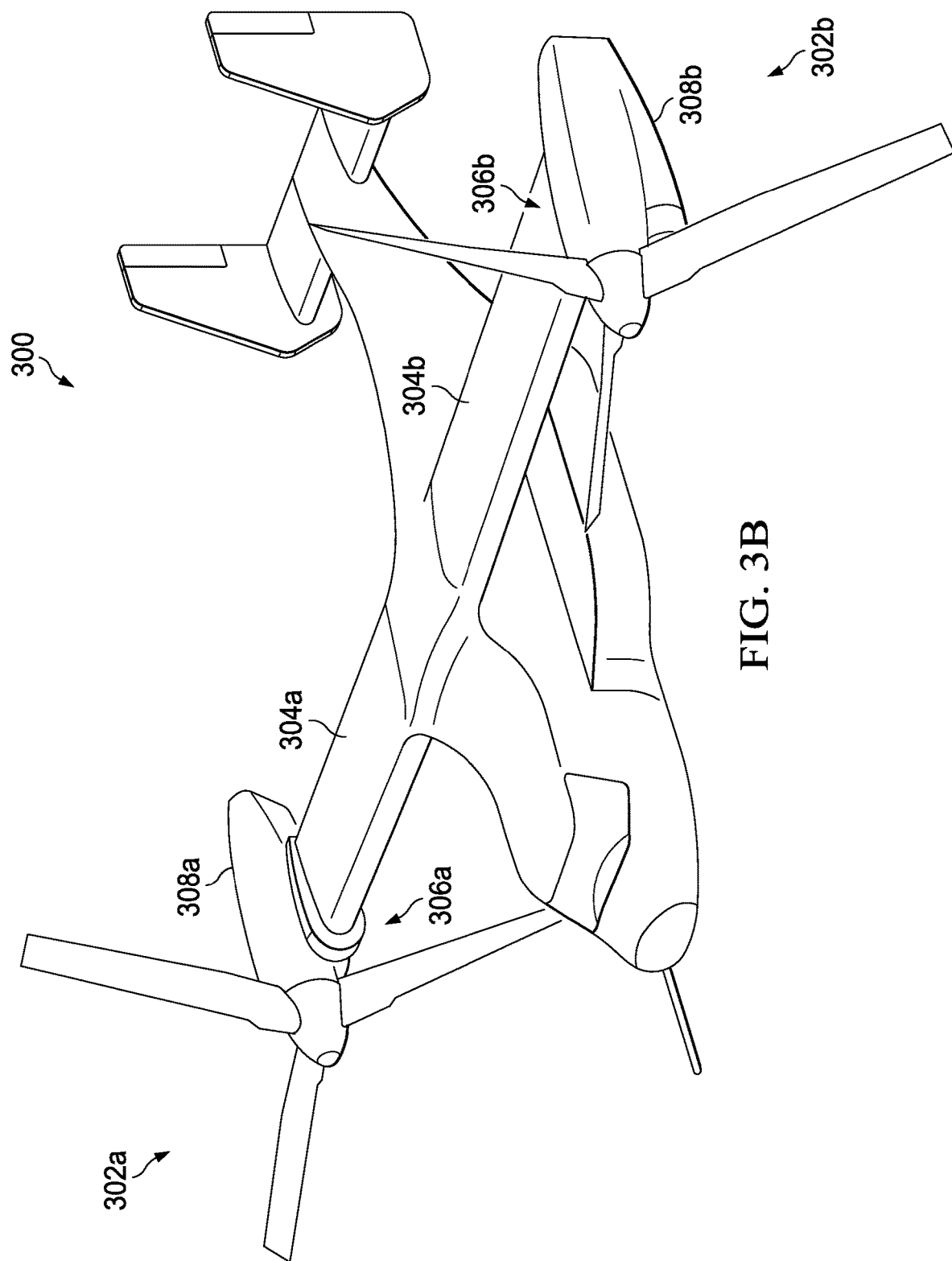
FIG. 3B shows a perspective view of the first tiltrotor aircraft in which the rotor system is in a cruise mode according to a particular embodiment of the present invention.

FIGS. 3A and 3B show a tiltrotor aircraft 300 that utilizes the system and methods in accordance with the present invention. FIG. 3A illustrates the tiltrotor aircraft 300 in takeoff-and-landing mode or hover mode, and FIG. 3B depicts the tiltrotor aircraft 300 in cruise mode. Tiltrotor aircraft 300 includes tiltrotor assemblies 302a and 302b that are carried by wings 304a and 304b, and are disposed at end portions 306a and 306b of wings 304a and 304b, respectively. Tiltrotor assemblies 302a and 302b include nacelles 308a and 308b, which carry the engines and transmissions of tiltrotor aircraft 300. Tiltrotor assemblies 302a and 302b move or rotate relative to wings 304a and 304b between a helicopter or hover mode in which tiltrotor assemblies 302a and 302b are tilted upward, such that tiltrotor aircraft 300 flies like a conventional helicopter; and an airplane or cruise mode in which tiltrotor assemblies 302a and 302b are tilted forward, such that tiltrotor aircraft 300 flies like a conventional propeller driven aircraft.

Figure 4A:
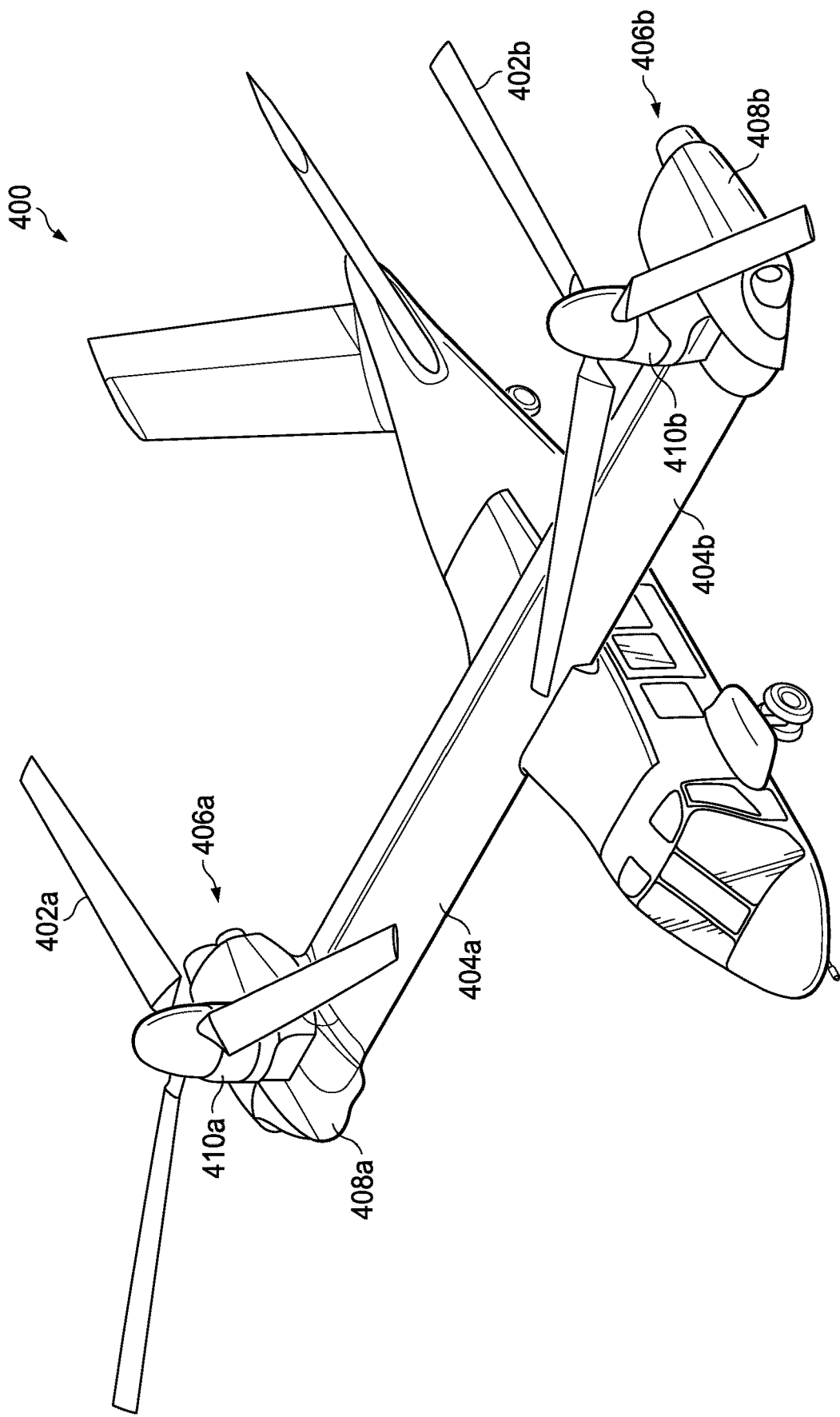
FIG. 4A shows a perspective view of a second tiltrotor aircraft in which the rotor system is in a takeoff-and-landing mode or hover mode according to a particular embodiment of the present invention.
Figure 4B:
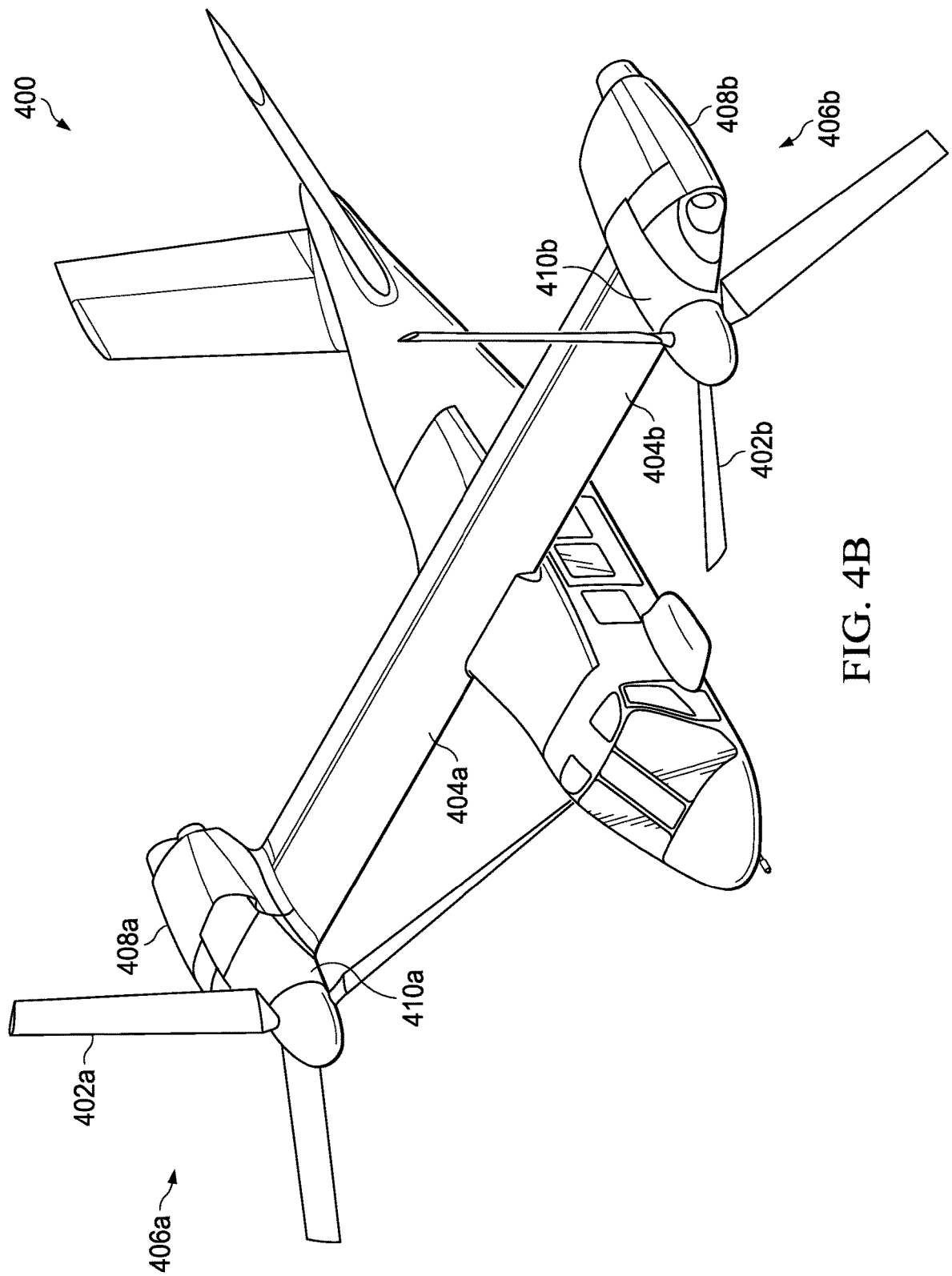
FIG. 4B shows a perspective view of the second tiltrotor aircraft in which the rotor system is in a cruise mode according to a particular embodiment of the present invention.

FIGS. 4A and 4B show another tiltrotor aircraft 400 that utilizes the system and methods in accordance with the present invention. FIG. 4A depicts the tiltrotor aircraft 400 in takeoff-and-landing mode or hover mode, and FIG. 4B illustrates the tiltrotor aircraft 400 in cruise mode. Tiltrotor aircraft 400 includes tiltrotor assemblies 402a and 402b that are carried by wings 404a and 404b, and are disposed at end portions 406a and 406b of wings 404a and 404b, respectively. Tiltrotor assemblies 402a and 402b include nacelles 408a and 408b, which include the engines and transmissions of tiltrotor aircraft 400. In this embodiment, the engines are fixed to the wing and do not rotate, rather, only the pylons 410a and 410b with the tiltrotor assemblies 402a and 402b rotate. Tiltrotor assemblies 402a and 402b move and rotate relative to wings 404a and 404b and the nacelles 408a and 408b. The tiltrotor assemblies 402a and 402b do not more relative to the wings 404a and 404b. Instead, during the transition between a helicopter or hover mode only the pylons 410a and 410b with the tiltrotor assemblies 402a and 402b rotate to redirect the thrust from the tiltrotor assemblies 402a and 402b. The tiltrotor aircraft 400 is still able to fly like a conventional helicopter; and an airplane or cruise mode in which one of the rotors are tilted forward, such that tiltrotor aircraft 400 flies like a conventional propeller driven aircraft.

In the present invention, the absolute position is determined from the two sensors as follows: the full stroke of the physical travel to be measured can be considered to be quantized into "bins" corresponding to the number of complete revolutions of the fine position sensor. Which bin is currently in effect can be determined by evaluating the indication from both the coarse and fine position sensor. For example, if the position of the coarse sensor falls clearly in between the endpoints of a particular bin, then that bin is clearly the one in effect. However, if the position indicated by the coarse position sensor is close enough the boundary between bins that the current bin cannot be reliably determined, the fine position measurement can be examined to determine the true position on the side of the bin boundary. Once the current bin has been determined, the relative position indicated by the fine position sensor is summed with the position corresponding to the current bin, resulting in a precise indication of position.

The two sensors can be wired directly to interfacing electronics. Alternately the workings of the two sensors can also be combined mechanically, electrically, electronically, or magnetically to reduce the wiring required to interface to the sensors. For example, the excitation source amplitude to a resolver can be adjusted over the full scale range of the device being measured by utilizing a magnetic coupling mechanism. The secondary outputs of the resolver can then carry both the fine and coarse measurement information. The coarse measurement is provided by the combined magnitude of the secondary outputs (mag=sqrt(sine$^2$+cos$^2$)), and the fine measurement is provided by the arctangent of the ratio of the resolver's secondary outputs. A linear variable differential transformer (LVDT) or a rotary variable differential transformer (RVDT) can be used in this example by utilizing the device as the coarse position measurement and using one secondary output as the input to a fine measurement resolver.

It is also possible to adjust the magnitude or phase angle of the resolver secondary's relative to the excitation to increase phase lag or vary magnitude over the working stoke by adjusting the excitation voltage through a passive variable resistor divider, or a variable resistor combined with a reactive element such as a capacitor, as the mechanism moves.

The outputs of the two sensors can be cross-compared as a check on their health. The outputs of the coarse and fine sensors should track within a particular bin within the expected error tolerances of the sensors and interfacing electronics. A deviation well outside this tolerance indicates a failure of a sensor or its interfacing electronics. This is in addition to typical in-line monitors employed, which vary by sensor type and application.

Another embodiment can employ sensors which are geared 1:1 with the mechanical input, but which are configured to provide electrical outputs of varying sensitivity. An example of this approach would be to use a single-cycle RVDT for the coarse sensor, and a multi-pole resolver for the fine sensor.

Figure 5:
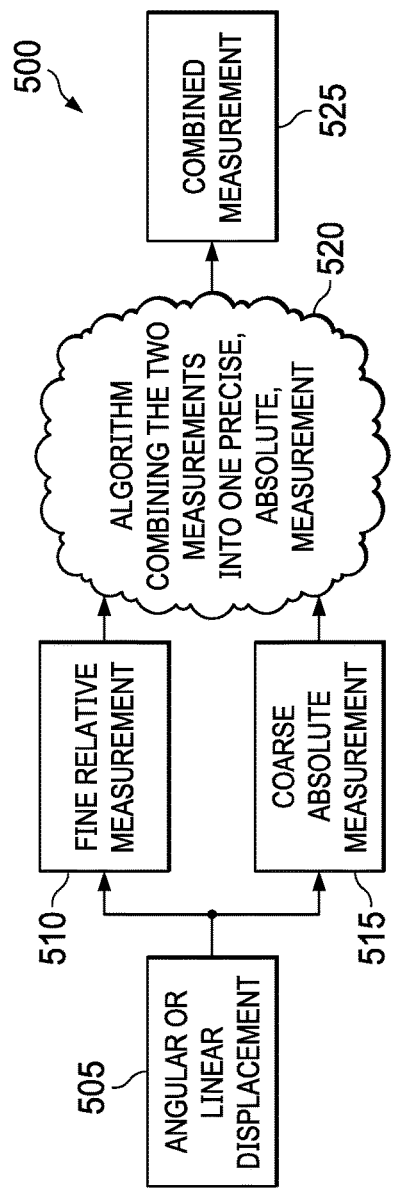
FIG. 5 depicts a block diagram of an embodiment of the present invention that shows basic principles.

FIG. 5 depicts a block diagram of a simple embodiment of the present invention, basic measurement system 500. The full physical range of possible displacements to be measured can be considered to be quantized into bins corresponding to the number of complete revolutions of a fine position sensor. The bin currently in effect can be determined by evaluating the indication from the fine sensor and a coarse sensor. An angular or linear displacement 505 is a displacement to be measured within a range of possible displacements. A fine relative measurement 510 and a coarse absolute measurement 515 are made within the displacement range. Fine relative measurement 510 and coarse absolute measurement 515 are combined in combination operation 520. The result is a single precise and accurate absolute measurement, combined measurement 525. If the position of the coarse sensor falls clearly in between the endpoints of a particular bin, then that bin is clearly the one in effect, and combination operation 520 is not necessary to obtain measurement 525. However, if the position indicated by the coarse position sensor is close enough to the boundary between bins that the current bin cannot be reliably determined, the fine position measurement can be examined to determine the side of the boundary and the true position. In this case, once the current bin has been determined, the relative position indicated by the fine position sensor is summed with the position corresponding to the current bin in combination operation 520, resulting in measurement 525.

The skilled artisan will recognize that fine relative measurement 510 and coarse absolute measurement 515 can be accomplished with the same type of device, but scaled differently, or each measurement can be made using a different type of device. The fine relative measurement 510 can be made using a resolver, a synchro, an optical encoder, a magnetic encoder, or any other device that provides a continuous 360° angular measurement over multiple revolutions. The skilled artisan will also recognize that coarse absolute measurement 515 can be made using a LVDT, a RVDT, a resolver, a synchro, an optical encoder, a magnetic encoder, a linear potentiometer, a rotary potentiometer, a Hall-effect device, or any other device that can provide a coarse absolute measurement 515 over the displacement range to be measured.

The skilled artisan will also recognize that the coarse sensor and the fine sensor of an embodiment can be wired directly to interfacing electronics, or, alternatively, the working of the coarse sensor and the fine sensor can also be combined mechanically, electrically, electronically, or magnetically to reduce the wiring required to interface to the sensors.

The skilled artisan will further recognize that the outputs of the two sensors can be cross-compared as a check on their health. The outputs of the coarse and fine sensors should track within a particular bin within the expected error tolerances of the sensors and any interfacing electronics. A deviation well outside these tolerances indicates a failure of a sensor or its interfacing electronics. This cross-comparison can be performed in addition to typical in-line monitors employed, which vary by sensor type and application.

Embodiments of the present invention may be used in a wide variety of applications. The applications suggested here are illustrative and do not limit the applications for which embodiments of the invention may be used. Embodiments may be used to measure, for example: the length of a cable deployed from a spool in such widely varying circumstances as construction projects to work underwater with a tethered vehicle; a fluid level in a container; measure the position of an object such as a rail car or a robot on a track; the position of an elevator car in a shaft; or the position of a robot appendage.

Figure 6:
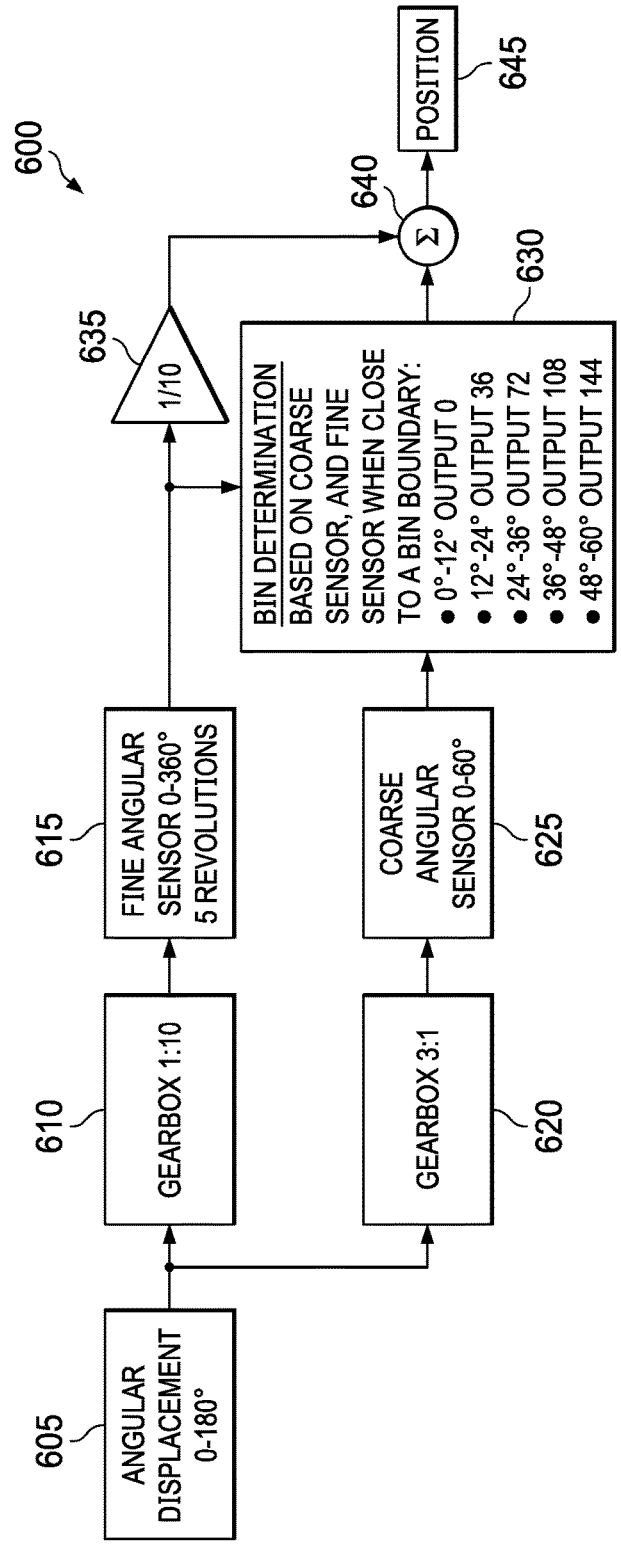
FIG. 6 illustrates a block diagram of an embodiment of the present invention that shows an implementation using two gearboxes.

FIG. 6 illustrates a block diagram of an embodiment of the present invention. Two-gearbox system 600 is configured to provide a precise and accurate measurement of an angular displacement within a range of 180°. The skilled artisan will recognize that this illustration and the angular measurement of 180° is exemplary and that embodiments of the invention may use similar features to deliver precise and accurate measurements of other types of displacements. The angular displacement 605 is a displacement within an angular range of 180°. Fine sensor gearbox 610 mechanically amplifies displacement by a ratio of 1:10 for fine sensor 615, so that every 3° of displacement within the angular displacement range is sensed as a 30° rotation of fine sensor 615. Fine sensor 615 is configured to rotate through five complete revolutions of 360° each. Each complete revolution of fine sensor 615 corresponds to one-fifth of the angular displacement range of 180°. Each of these segments of the angular displacement range of 180° is 36° and constitutes a bin into which a measurement from fine sensor 615 may fall. Any given measurement that is output from fine sensor 615 may be in any one of the five 36°-degree-wide bins, and a measurement from another sensor is required to determine the bin in which the measurement from fine sensor 615 actually lies. Coarse sensor gearbox 620 mechanically reduces displacement 605 by a ratio of 3:1 for coarse sensor 625, so that every 3° of displacement within the angular displacement range is sensed as a 1° rotation of coarse sensor 625. Coarse sensor 625 is configured to rotate through a range of 60° to provide a coarse location of a measurement from fine sensor 615 with the angular displacement range of 180°. A movement of coarse sensor 625 through its range of 60° corresponds to the entire angular displacement range of 180°. An output of fine sensor 615 and an output of coarse sensor 625 go to a processor for bin determination operation 630, a determination of the bin in which the measurement from fine sensor 615 lies. If the measurement from coarse sensor 625 falls within the first fifth of its range of 60°, 0°-12°, the fine measurement falls within the first fifth of the angular displacement range of 180°, between 0° and 36°, and the output of bin determination operation 630 is 0°. If the measurement from coarse sensor 625 falls within the second fifth of its range of 60°, 12°-24°, the fine measurement falls within the second fifth of the angular displacement range of 180°, between 36° and 72°, and the output of bin determination operation 630 is 36°. Similarly, bin determination operation 630 provides an output of the lowest angular displacement of the other bins within the angular displacement range, depending on the measurement from coarse sensor 625. The measurement from fine sensor 615 is divided by 10 in an operation represented by division operation 635. The output of bin determination operation 630 and the output of division operation 635 are summed in an operation represented by summation operation 640. The output of summation operation 640 is position 645, the precise, accurate measurement of displacement 605 within the angular displacement range of 180°.

Continuing reference to FIG. 6, displacement 605 may be translated by fine sensor gearbox 610 to fine sensor 615 to yield a fine measurement of, for example, 200°, which could reflect any of five displacements within the angular displacement range of 180°, one displacement within each of the five bins created by the five full revolutions of fine sensor gearbox 610. A measurement from coarse sensor 625 is required to determine the bin in which the measurement from fine sensor gearbox 610 falls. Displacement 605 may be translated by coarse sensor gearbox 620 to coarse sensor 625 to yield a coarse measurement of 42.7°. In this example, the fine measurement of 200° and the coarse measurement of 42.7° are inputted in bin determination operation 630. The coarse measurement of 42.7° falls within the fourth of five bins within the angular displacement range of 180°, the bin encompassing 108°-144°, and bin determination operation 630 outputs 108°, the lowest angular displacement of the fourth bin. Division operation 635 divides the fine angular measurement of 200° by 10, outputting 20°. The outputs of bin determination operation 630, 108°, and of division operation 635, 20°, are inputted into summation operation 640, which adds then to output position 645, the precise and accurate measurement of displacement 605 of 108° plus 20°, 128°.

Figure 7A:
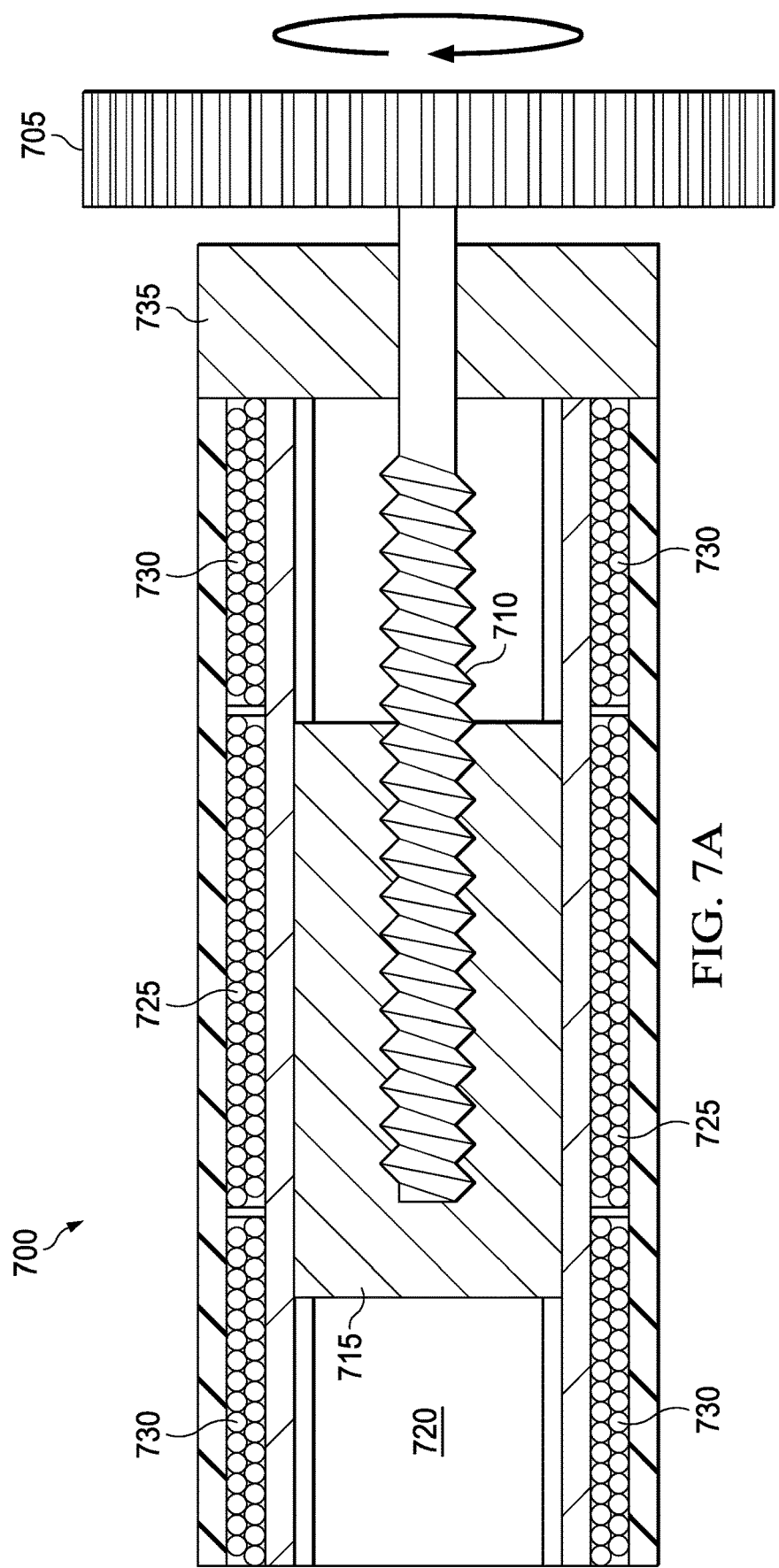
FIG. 7A illustrates aspects of an embodiment of the present invention using a resolver and a linear variable differential transformer (LVDT)

FIG. 7A illustrates a cross-sectional view of one embodiment of the present invention in which a resolver is used as a fine sensor and a linear variable differential transformer (LVDT) is used as a coarse sensor. In this and some other embodiments of the present invention, the excitation source amplitude to a resolver can be adjusted over the full scale range of the device being measured by using a magnetic coupling mechanism. The secondary outputs of the resolver can then carry both the fine and the coarse measurement information. A coarse measurement is provided by the combined magnitude of the secondary outputs, and a fine measurement is provided by the four-quadrant arctangent of the ratio of the resolver's secondary outputs. An LVDT or an RVDT can as the coarse position measurement device and using one secondary output as the input to the fine measurement resolver. FIG. 7A, illustrates such an embodiment. LVDT-resolver measurement system 700 provides a measurement for a displacement using a linear displacement sensor, the LVDT for the coarse measurement can be calculated and the resolver, an angular displacement sensor, to provide the fine measurement. Input gear 705, which may be used to translate either an angular or a linear displacement into an angular displacement, is attached to screw 710, which rotates with input gear 705. As input gear 705 turns, screw 710 turns and moves displacement core 715 linearly within linear displacement shaft 720 which is surrounded by primary linear winding 725 and secondary linear winding 730, and which is slotted to keep displacement core 715 from rotating with screw 710. Voltages produced by primary linear winding 725 and secondary linear winding 730 as screw 710 moves displacement core 715 within displacement shaft 720 provide information on the position of displacement core 715 for the coarse measurement. As input gear 705 turns, it also rotates screw 710 within angular displacement sensor 735, which provides the fine measurement.

Figure 7B:
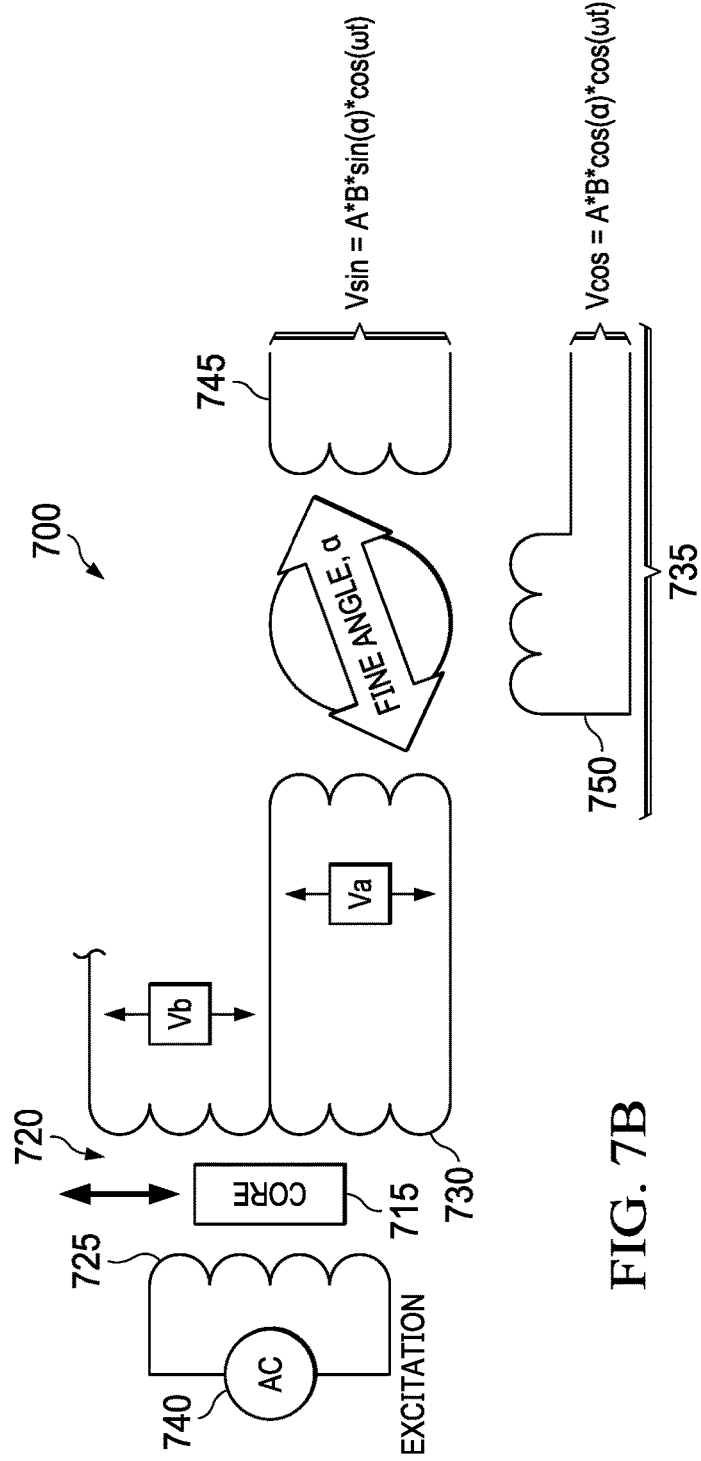
FIG. 7B illustrates other aspects of an embodiment of the present invention using a resolver and an linear variable differential transformer (LVDT)

FIG. 7B illustrates aspects of LVDT-resolver measurement system 700. The position of displacement core 715 within displacement shaft 720, the excitation voltage provided by the alternating-current power source 740, and the transformation ratio across displacement shaft 720 determine the voltage $V_a$ across secondary linear winding 730. Voltage $V_a$ is used as the excitation voltage for angular displacement sensor 735, which is configured to produce two output voltages. The first output voltage $V_{sin}$ from angular displacement sensor 735 is produced at first angular sensor winding 745 and is proportional to voltage $V_a$ and the sine of the measured angle, and the second output voltage $V_{cos}$ is produced at second angular sensor winding 750 and is proportional to $V_a$ and the cosine of the measured angle. The coarse measurement is determined from the magnitude of the resultant of $V_{sin}$ and $V_{cos}$, $\sqrt{(V_{sin}^2\alpha+V_{cos}^2\alpha)}$, where $\alpha$ is the angle formed by the orientation of screw 710 within angular displacement sensor 735 relative to first angular sensor winding 745 and second angular sensor winding 750, $V_{sin}=A*B*\sin(\alpha)\cos(\omega t)$, and $V_{cos}=A*B*\cos(\alpha)\cos(\omega t)$. The fine measurement is determined from the four-quadrant arctangent of the ratio $V_{sin}/V_{cos}$.

The skilled artisan will recognize that one can also adjust the magnitude or phase angle of the resolver's secondary outputs relative to the excitation so that one gets increasing phase lag or varying magnitude over the displacement range by adjusting the excitation voltage as the mechanism moves by using a passive variable resistor divider or a variable resistor combined with a reactive element such as a capacitor.

Figure 8:
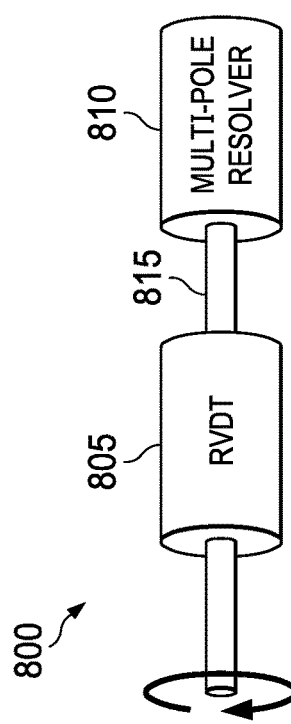
FIG. 8 shows an embodiment of the present invention using an rotary variable differential transformer (RVDT) and a multipole resolver.

FIG. 8 illustrates another embodiment of the present invention that shows an RVDT-and-multipole-resolver measurement system 800. In this embodiment, the coarse sensor and the fine sensor are geared 1:1 with the mechanical input but are configured to provide electrical outputs of varying sensitivity. In this embodiment, the coarse sensor is RVDT 805 and the fine sensor is multipole resolver 810. RVDT 805 and multipole resolver 810 are mounted on common shaft 815. Common shaft 815 can be configured to rotate through any range, but is typically useful for travels through ranges as small as +/−40° or as large as +/−80°. Both RVDT 805 and multipole resolver 810 rotate with and through the same angular displacement as common shaft 815. Multipole resolver 810 can be configured with a varying number of poles to achieve the desired measurement precision, with more poles yielding more measurement bins and higher precision.

Figure 9:
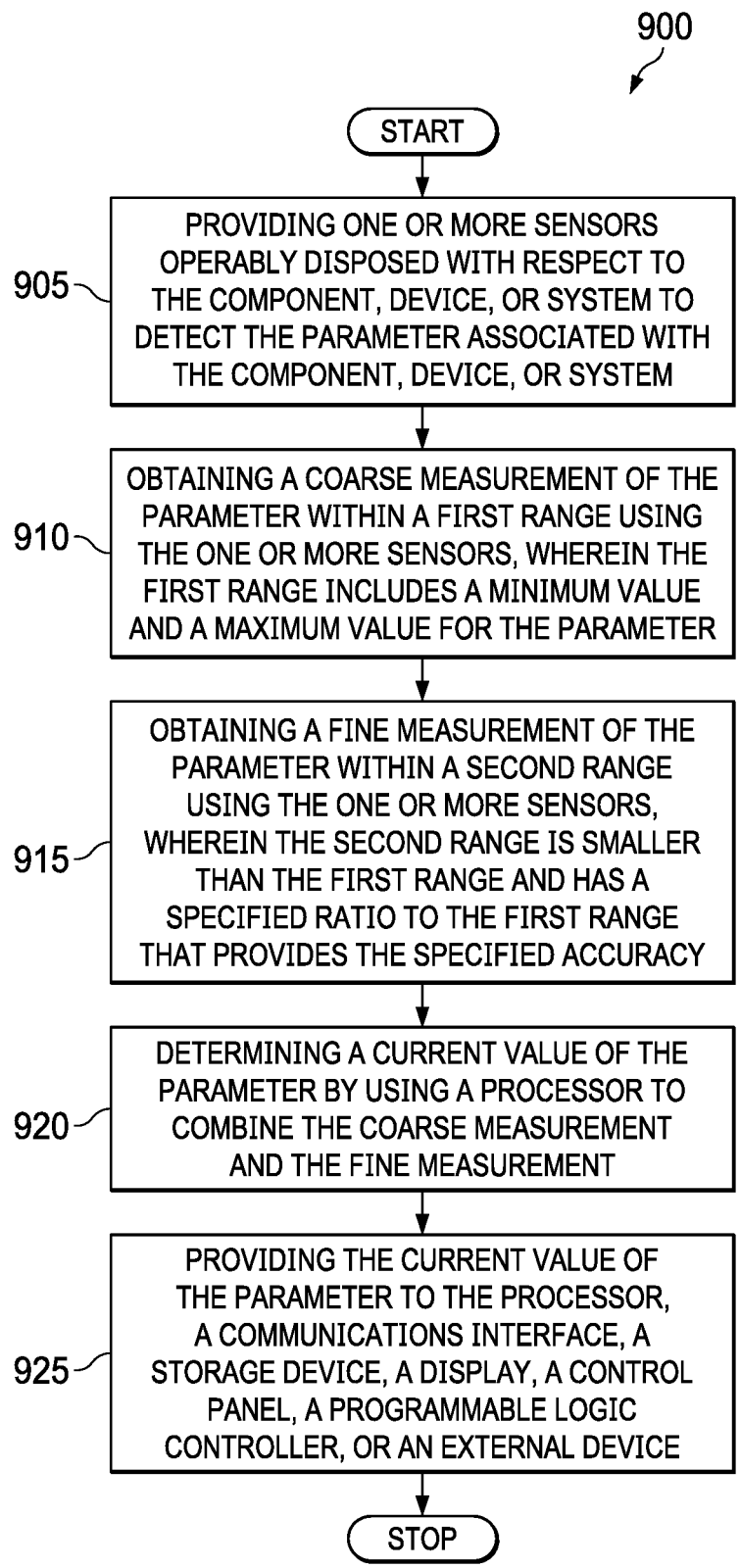
FIG. 9 depicts a flowchart of a method embodiment of the present invention.

FIG. 9 depicts a flowchart for a method embodiment of the present invention. Method 900 for measuring a parameter associated with a component, device, or system with a specified accuracy includes block 905, providing one or more sensors operably disposed with respect to the component, device, or system to detect the parameter associated with the component, device, or system. Method 900 also includes block 910, which includes obtaining a coarse measurement of the parameter within a first range using the one or more sensors, wherein the first range includes a minimum value and a maximum value for the parameter. Next, at block 915, the method includes obtaining a fine measurement of the parameter within a second range using the one or more sensors, wherein the second range is smaller than the first range and has a specified ratio to the first range that provides the specified accuracy. Method 900 further includes block 920, which includes the step of determining a current value of the parameter by using a processor to combine the coarse measurement and the fine measurement. Finally, at block 925, the method includes providing the current value of the parameter to the processor, a communications interface, a storage device, a display, a control panel, a programmable logic controller, or an external device.

Figure 10:
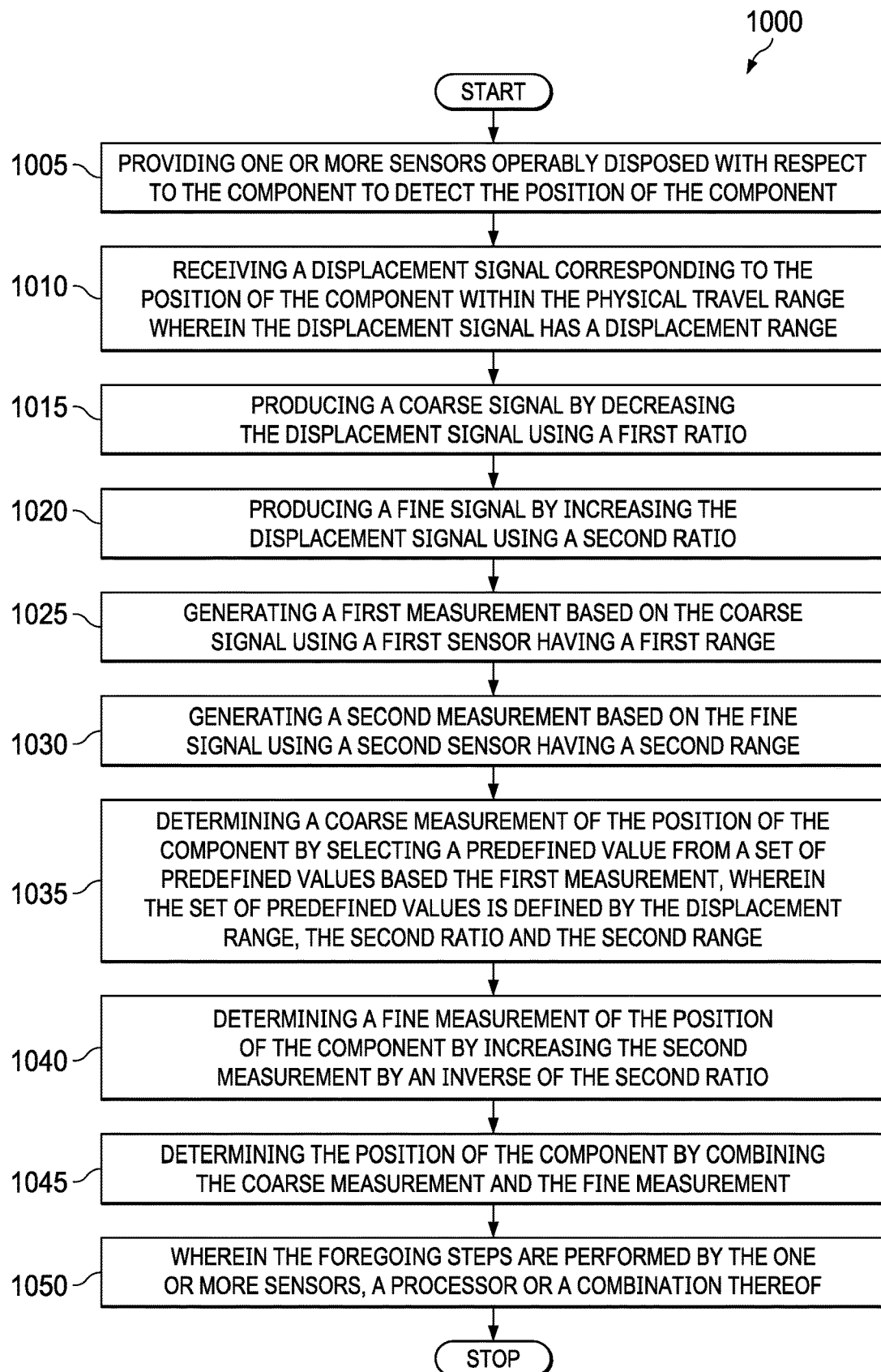
FIG. 10 illustrates a flowchart of another method embodiment of the present invention.

FIG. 10 depicts a flowchart for a method 1000 for determining a position of a component within a physical travel range of the component at block 1005, which includes providing one or more sensors operably disposed with respect to the component to detect the position of the component. Next, at block 1010, the method includes receiving a displacement signal corresponding to the position of the component within the physical travel range wherein the displacement signal has a displacement range. Next, at block 1015, the method includes producing a coarse signal by decreasing the displacement signal using a first ratio. At block 1020, the method includes producing a fine signal by increasing the displacement signal using a second ratio. Method 1000 further includes block 1025, generating a first measurement based on the coarse signal using a first sensor having a first range. Method 1000 further includes block 1030, which includes generating a second measurement based on the fine signal using a second sensor having a second range. At block 1035, the next step is to determine a coarse measurement of the position of the component by selecting a predefined value from a set of predefined values based the first measurement, wherein the set of predefined values is defined by the displacement range, the second ratio and the second range, and at block 1040, the method includes determining a fine measurement of the position of the component by increasing the second measurement by an inverse of the second ratio. At block 1045, the method includes determining the position of the component by combining the coarse measurement and the fine measurement. Finally, at block 1050, the foregoing steps are performed by the one or more sensors, a processor or a combination thereof.

Figure 11:
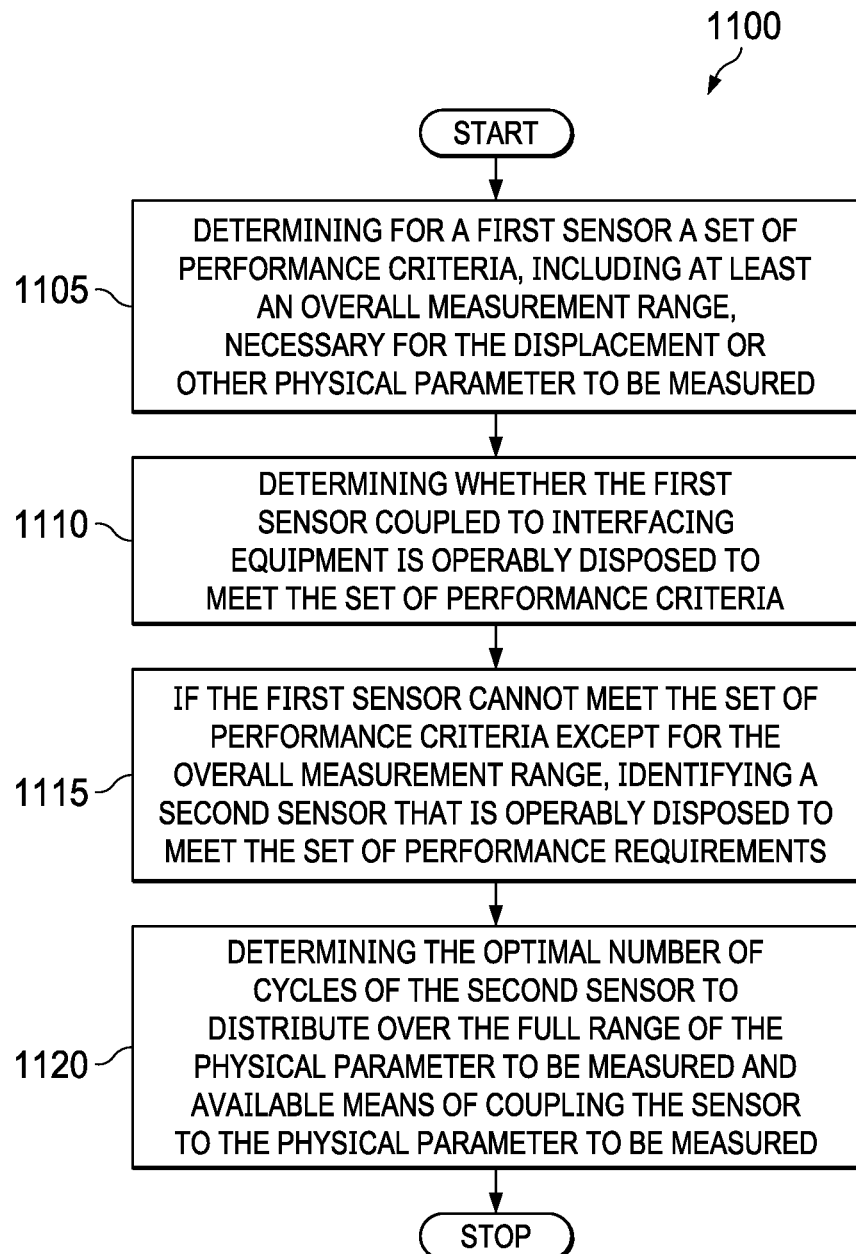
FIG. 11 illustrates a flowchart for a method embodiment of the present invention.

FIG. 11 illustrates a method of the present invention in which the bins used to determine position are optimized. Method 1100 is a method for optimizing measurement bins that includes block 1105, which begins by determining for a first sensor a set of performance criteria, including at least an overall measurement range necessary for the displacement or other physical parameter to be measured. Next, at block 1110, the method includes determining whether the first sensor coupled to interfacing equipment is operably disposed to meet the set of performance criteria. Next, at block 1115, if the first sensor cannot meet the set of performance criteria except for the overall measurement range, then identifying a second sensor that is operably disposed to meet the set of performance criteria. This second sensor must be capable of accepting a total mechanical input that is equal to the overall range to be measured, and its electrical output must map to a repeating subset of mechanical input. Finally, at block 1120, the method includes determining the optimal number of cycles of the second sensor to distribute over the full range of the physical parameter to be measured and available means of coupling the sensor to the physical parameter to be measured. One would typically prefer this to be the minimum number of cycles necessary to achieve the desired performance, as this reduces the complexity of the coupling mechanism involved.

Those skilled in the art will recognize that the devices and methods disclosed herein provide methods and systems for measurement of precise and accurate measurements with sensors that are limited in displacement.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A method for measuring a parameter associated with a component, device, or system, comprising:
   providing one or more sensors operably disposed with respect to the component, device, or system to detect the parameter associated with the component, device, or system;
   obtaining a coarse measurement of the parameter within a first range using the one or more sensors;
   obtaining a fine measurement of the parameter within a second range using the one or more sensors, wherein the second range is smaller than the first range and has a specified ratio to the first range that provides a specified accuracy;
   determining a current value of the parameter by using a processor to combine the coarse measurement and the fine measurement; and
   providing the current value of the parameter to the processor, a communications interface, a storage device, a display, a control panel, a programmable logic controller, or an external device.

2. The method of claim 1, wherein the first range comprises a minimum value and a maximum value for the parameter.

3. The method of claim 1, wherein:
   the parameter comprises a linear position, a linear distance, an angular position, an angular distance, a displacement, a magnitude, a fluid level, or a signal level;
   the processor comprises a controller, a microprocessor, a computer, an electrical circuit, or a combination thereof; and
   the one or more sensors comprise at least a first sensor for the coarse measurement and at least a second sensor for the fine measurement.

4. The method claim 3, wherein:
   the first sensor comprises a rotary variable differential transformer (RVDT), a linear variable differential transformer (LVDT), a resolver, a synchro, an optical encoder, a magnetic encoder, a linear potentiometer, a rotary potentiometer, or a Hall-effect device; and the second sensor comprises the resolver, the synchro, the optical encoder, or the magnetic encoder.

5. The method of claim 1, wherein combining the coarse measurement and the fine measurement comprises combining the coarse measurement and the fine measurement mechanically, electrically, electronically, or magnetically.

6. The method of claim 1, further comprising:
obtaining one or more additional measurements of the parameter within one or more additional ranges using the one or more sensors, wherein each additional range has an additional specified ratio to the first range or to the second range that provides the specified accuracy; and the current value for the parameter is determined by combining the coarse measurement, the fine measurement, and the one or more additional measurements.

7. The method of claim 1, further comprising:
receiving an input signal representing the parameter;
creating a first signal by dividing or multiplying the input signal by a first ratio and using the first signal to obtain the fine measurement of the parameter; and
creating a second signal by dividing or multiplying the input signal by a second ratio and using the second signal to obtain the coarse measurement of the parameter.

8. The method of claim 1, further comprising:
determining an error associated with the current value of the parameter; or
calibrating the one or more sensors.

9. A method for determining a position of a component within a physical travel range of the component comprising:
providing one or more sensors operably disposed with respect to the component to detect the position of the component;
receiving a displacement signal corresponding to the position of the component within the physical travel range wherein the displacement signal has a displacement range;
determining a course measurement by decreasing the displacement signal using a first ratio and a first sensor having a first range;
determining a fine measurement by increasing the displacement signal using a second ratio and a second sensor having a second range; and
determining the position of the component by combining the coarse measurement and the fine measurement.

10. The method of claim 9, wherein determining the course measurement by decreasing the displacement signal using the first ratio and the first sensor having the first range comprises:
producing a coarse signal by decreasing the displacement signal using the first ratio;
generating a first measurement based on the coarse signal using the first sensor having the first range; and
determining the coarse measurement of the position of the component by selecting a predefined value from a set of predefined values based the first measurement.

11. The method of claim 10, wherein the set of predefined values is defined by the displacement range, the second ratio and the second range.

12. The method of claim 10, wherein determining the coarse measurement is further based on the second measurement whenever the selection of the predefined value cannot be precisely determined from the first measurement alone.

13. The method of claim 9, wherein determining the fine measurement by increasing the displacement signal using the second ratio and the second sensor having the second range comprises:
producing a fine signal by increasing the displacement signal using the second ratio;
generating a second measurement based on the fine signal using the second sensor having the second range; and
determining the fine measurement of the position of the component by increasing the second measurement by an inverse of the second ratio.

14. The method of claim 9, wherein the combining the course measurement and the fine measurement comprises combining the course measurement and the fine measurement mechanically, electrically, electronically, or magnetically.

15. An apparatus for measuring a parameter associated with a component, device, or system, comprising:
one or more sensors, wherein the one or more sensors are:
operably disposed to obtain a coarse measurement of the parameter within a first range; and
operably disposed to obtain a fine measurement of the parameter within a second range, wherein the second range is smaller than the first range and has a specified ratio to the first range that provides a specified accuracy; and
a processor communicably coupled to the one or more sensors.

16. The apparatus of claim 15, wherein the first range comprises a minimum value and a maximum value for the parameter.

17. The apparatus of claim 15, wherein:
the parameter comprises a linear position, a linear distance, an angular position, an angular distance, a displacement, a magnitude, a fluid level, or a signal level;
the processor comprises a controller, a microprocessor, a computer, an electrical circuit, or a combination thereof; and
the one or more sensors comprise at least a first sensor for the coarse measurement and at least a second sensor for the fine measurement.

18. The apparatus of claim 17, wherein:
the first sensor of the one or more sensors comprises a rotary variable differential transformer (RVDT), a linear variable differential transformer (LVDT), a resolver, a synchro, an optical encoder, a magnetic encoder, a linear potentiometer, a rotary potentiometer, or a Hall-effect device; and
the second sensor comprises the resolver, the synchro, the optical encoder, or the magnetic encoder.

19. The apparatus of claim 15, wherein:
the one or more sensors are operably disposed to obtain one or more additional measurements of the parameter within one or more additional ranges, wherein each additional range has an additional specified ratio to the first range or to the second range that provides the specified accuracy; and
the processor is operably disposed to determine the current value for the parameter by combining the coarse measurement, the fine measurement, and the one or more additional measurements.

20. The apparatus of claim 15, wherein the processor is operably disposed to:
receive an input signal representing the parameter;
create a first signal by dividing or multiplying the input signal by a first ratio and using the first signal to obtain the fine measurement of the parameter; and
create a second signal by dividing or multiplying the input signal by a second ratio and using the second signal to obtain the coarse measurement of the parameter.

21. The apparatus of claim 15, wherein the processor is operably disposed to:
determine an error associated with a current value of the parameter; or
calibrate the one or more sensors.

22. An apparatus for determining a position of a component within a physical travel range of the component comprising:
a first sensor having a first range operably disposed to determine a coarse measurement by decreasing a displacement signal using a first ratio, wherein the displacement signal corresponds to the position of the component within the physical travel range and the displacement signal has a displacement range;
a second sensor having a second range operably disposed to determine a fine measurement by increasing the displacement signal using a second ratio; and
a mechanical, electrical, electronic, or magnetic device communicably coupled to the first sensor and the second sensor and operably disposed to determine the position of the component by combining the coarse measurement and the fine measurement.

23. The apparatus of claim 22, wherein the first sensor determines the course measurement by decreasing the displacement signal using the first ratio by:
producing a coarse signal by decreasing the displacement signal using the first ratio;
generating a first measurement based on the coarse signal using the first sensor having the first range; and
determining the coarse measurement of the position of the component by selecting a predefined value from a set of predefined values based the first measurement.

24. The apparatus of claim 23, wherein the set of predefined values is defined by the displacement range, the second ratio and the second range.

25. The apparatus of claim 23, wherein determining the coarse measurement is further based on the second measurement whenever the selection of the predefined value cannot be precisely determined from the first measurement alone.

26. The apparatus of claim 22, wherein second sensor determines the fine measurement by increasing the displacement signal using the second ratio by:
producing a fine signal by increasing the displacement signal using the second ratio;
generating a second measurement based on the fine signal using the second sensor having the second range; and
determining the fine measurement of the position of the component by increasing the second measurement by an inverse of the second ratio.

\* \* \* \* \*